United States Patent [19]

Maurer et al.

[11] Patent Number: 4,876,727

[45] Date of Patent: Oct. 24, 1989

[54] METHOD AND APPARATUS FOR DETECTING FAULTS IN AN OBJECT

[75] Inventors: Albrecht Maurer, Seligenstadt; Josef Fabian, Hanau, both of Fed. Rep. of Germany

[73] Assignee: Nukem GmbH, Hanau, Fed. Rep. of Germany

[21] Appl. No.: 8,950

[22] Filed: Jan. 30, 1987

[30] Foreign Application Priority Data

Feb. 10, 1986 [DE] Fed. Rep. of Germany ....... 3604111

[51] Int. Cl.$^4$ ............................................. G06K 9/62
[52] U.S. Cl. ............................................. 382/8; 73/598; 356/237; 358/106; 382/34
[58] Field of Search .................... 382/34, 54, 30, 8, 42; 358/106; 73/602, 587, 596, 598, 606; 356/237

[56] References Cited

U.S. PATENT DOCUMENTS

| 3,576,534 | 8/1969 | Steinberger | 382/30 |
| 4,079,416 | 3/1978 | Faani | 358/106 |
| 4,091,394 | 5/1978 | Kashioka | 382/48 |
| 4,111,557 | 9/1978 | Rottenkolber | 356/394 |
| 4,160,385 | 7/1979 | Gromlich | 73/622 |
| 4,435,835 | 3/1984 | Sakow | 382/34 |
| 4,579,455 | 4/1986 | Levy | 358/106 |
| 4,613,234 | 9/1986 | Cruickshank | 358/106 |
| 4,635,293 | 1/1987 | Watanabe | 382/6 |
| 4,644,582 | 2/1987 | Morishita et al. | 382/6 |
| 4,707,734 | 11/1987 | Labinger | 358/106 |

Primary Examiner—Leo H. Boudreau
Attorney, Agent, or Firm—Cushman, Darby & Cushman

[57] ABSTRACT

The subject of the invention is a method and a device for detecting faults in or on an object. The object form is measured and then compared with a master form. In this comparison one point and one line of the object form and of the master form with reference to a coordinate system, are brought into coincidence by shifting the form or master form. Partial forms and partial master forms are then displaced relative to one another in partial areas of the coordinate system until a maximum overlap is detected. Then the nonoverlapping points of the partial forms are checked for faults.

10 Claims, 3 Drawing Sheets

METHOD AND APPARATUS FOR DETECTING FAULTS IN AN OBJECT

BACKGROUND OF THE INVENTION

1. Field of the Art

The invention relates to a method and a device for detecting faults in or on an object whose respective form is measured and compared with a master form in order to evaluate differences between the two forms caused by faults.

2. Description of the Prior Art

A fault-free condition of technical objects is necessary in many applications for safety reasons. Mechanically stressed components often must have no structural faults at all in order to sustain the stresses encountered in operation. The objects are therefore frequently checked for faults after manufacture and after a lengthy period of operation. To reduce the expense of checking, it is best to check the objects while they are still installed. One way of detecting faults in objects is to compare their form, both the external shape and the structure, with a master form corresponding to a fault-free object and obtained by measuring an object without faults. Frequently, the actual form of an object does not correspond in its external geometry to a master shape or image because the object by the very nature of its design: for example, it is unstable and deforms during checking. In order to determine whether the object has the necessary quality in comparison with the master, it is necessary to first achieve congruence in the geometry, in order to then compare measured values of identical coordinates and to check whether non-permissible differences indicative of faults are present or not.

It is an object of the invention develop a method for detecting faults in or on an object whose actual geometry possibly differs from the master during a comparsion so that faults can be detected in spite of differences in the forms not stemming from faults. Therefore, when the respective object has, for example. A geometry differing from that of the master due to, for example, mechanical stresses present during the measuring process, these can be taken into account.

SUMMARY OF THE INVENTION

In order to accomplish the object, the invention provides a method for detecting faults in or on an object. First, measured values are obtained with measuring means at various points of the object. These measured values are then stored at memory locations which relate to a coordinate system. Master form data is also stored and related to the same coordinate system. A comparsion of the contents of memory locations containing measured values and master form data, respectively, for corresponding coordinates is then made. The measured values and the master form data are then aligned by re-storing the measured values in corresponding storage locations so that the measured values and the master form data relate at an edge and a corner that are the same for both the measured object and the master object. Measured values and master form data of partial areas having the same coordinate distances to the edge are then compared. Then the measured values and master form data of the partial areas are aligned by re-storing the measured values in such a way that minimal differences in the contents of the memory locations corresponding in the coordinate system are obtained. The contents of memory locations previously re-stored to obtain minimum differences are then tested for fault related features. A signal is then emitted when faults are encountered. Using the method according to the invention, the various parts of the respective form are brought to coincidence with parts of the master form (comparison of actual object with required or master form). It is assumed here that the partial forms in fault-free condition differ practically only very slightly. This is always the case in aircraft components, for example, which undergo elastic changes of shape as a result of mechanical stresses. The method according to the invention is therefore at least applicable for objects whose form changes can be calculated using Hooke's Law. Points which cannot be brought to coincidence are simply detected using the method of the present invention. Faults can be recognized by their typical shape. It may in some circumstances be expedient to investigate areas of the object which are known to have faults using one or more other checking methods in order to ascertain further details of the fault detected.

If there are sections of the object and of the master form with constant thickness, it is preferable to coincide one point and one line of the object with the master form in a coordinate system by shifting the form or master form, and then shifting the partial forms and partial master forms relative to one another in partial areas of the coordinate system until a maximum overlap is detected, with the nonoverlapping points of the partial forms being checked for faults. This method is particularly suitable for forms having a constant thickness in one coordinate direction or for the various sections which are each identical in thickness.

In a preferred embodiment, the respective form and master form are brought to coincidence in a cartesian coordinate system, with points of the partial forms and the partial master forms extending along straight lines brought to coincidence at minimum absolute values by comparison of the absolute values of identification quantity differences of the partial forms and partial master forms obtained with and without relative displacement of the partial forms and partial master forms. In this embodiment, displacements are carried out along straight lines preferably running parallel to the coordinate axes. The grid spacing of the straight lines is best selected so that the outlines of the form sections to be compared with one another do not differ significantly between adjacent straight line. This reduces the time needed to carry out the overlapping of both forms.

The integral of the absolute value of the partial object form in relation to the partial master form without displacement is compared with the integral of the absolute value with displacement for an increase or decrease. The displacement of the respective partial form in relation to the partial master form is continued in subsequent steps with the comparsion of the absolute values until a minimum for the absolute value is achieved. In this way, the minimum of the absolute value can be determined in a few displacement steps. The time spent on fault detection is thereby reduced.

BRIEF DESCRIPTION OF THE DRAWINGS

The invention is described in detail in the following using an embodiment illustrated in the drawing, showing further details, features and advantages.

DETAILED DESCRIPTION OF THE PREFERRED EMBODIMENT

Figure 1:
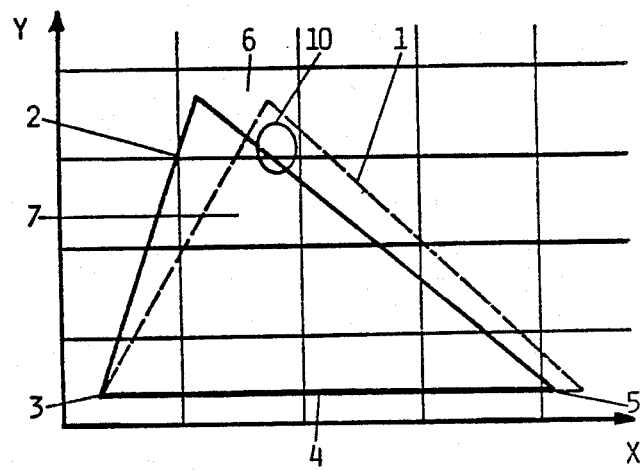
FIG. 1 shows in one coordinate plane a form of an object and a master form.
Figure 2:
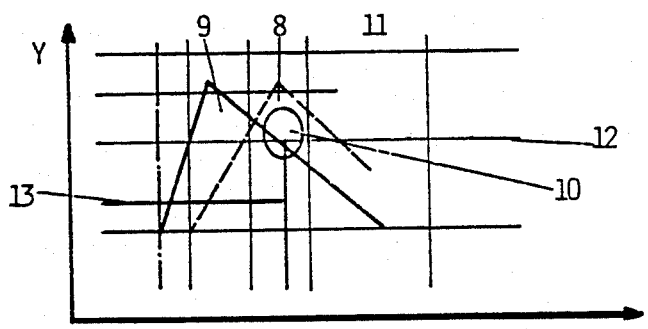
FIG. 2 shows a partial area of the coordinate plane with a partial form and a partial master form.

The form (1) of an object, for example an aircraft component with side lengths of 3 m × 8 m, for example, is obtained using measuring methods based, for example, on Ultrasonic waves. The values so obtained can be preferably digitalized and stored. A master form (2) corresponding to a fault-free object of identical shape and structure under certain circumstances is also stored as digital values. The circumstances can be, for example, a lack of external stresses. The form (1) is shown hatched in FIG. 1.

As a result of stresses acting on the object during measurement of the form, form (1) differs from master form (2). The object is a component of an aircraft, for example. This component, for example a load-bearing member, is tested while installed, and having elastic deformations. Initially, no overlap is possible between form (1) and master form (2) due to their differences, Form (1) and master form (2) are expediently C-images of an object measured using the ultrasonic method. Form (1) and master form (2) are therefore henceforward designated image and master image.

As a general principle, the following method is used to detect faults in or on the object or form. The measured values obtained by measuring equipment are stored in memory locations that related to a coordinate system. The measuring equipment records the physical properties of the object or form that are of significance for a check. The measuring device and the memory are dealt with in detail in the following. The data corresponding to master form (2) are filed in memory, locations that relate to the same coordinate system. The measured values in the memory locations are then aligned with the data corresponding to the master form (2) and stored in corresponding locations by first comparing the contents of the memory locations corresponding to one another in the coordinate system. This comparison is intended to find equal values corresponding to predetermined borders of form (1) and master form (2). It is based on a similar corner and edge existing in both object form (1) and master form (2). Re-storing groups the measured values for the object form (1) and the data for the master form (2) in such a way that the corner and the edge have corresponding memory locations. Partial areas of form (1) and of master form (2) are then selected that have the same coordinate distances which are related to the corner and the edge. The contents the memory locations corresponding to these partial areas for object form (1) and master form (2) are compared. Depending on the amount of the differences, the measured values are re-stored until there are minimal differences which cannot be further reduced by re-stored. These differences are checked for features which are typical for faults by comparing the differences with preset threshold values. If the result of this comparison shows that there is a fault in the object form (1), a signal is generated, which may be visual or acoustic, for example. In particular, it is possible to display the fault on a monitor with reference to the coordinate system.

It often occurs that objects or forms (1) have a constant thickness or sections of constant thickness which can be selected one after the other for measurement. The sections of identical thickness can be processed as geometric figures on a plane which correspond to the aforementioned images.

How correspondence of the image and the master image is achieved will now be further described with reference to FIG. 1. In order to detect faults in the object by the comparative method in spite of symmetrical differences not due to faults between the image and the master image, the image and the master image are first superimposed at at least one point (3) in a cartesian coordinate system. Furthermore, two external lines (4), (5) of object form (1) and of (master) form (2) respectively, are superimposed along a section common to both forms. These measures are carried out in a first process step by relative displacement between image and master image.

Partial areas are then formed which contain partial forms. The partial areas shown in FIG. 1, as partial areas (6) and (7) formed by rectangular sections whose sides are parallel in pairs in the X-Y coordinate axes.

The partial areas of interest are those which contain both partial object forms and partial master forms. The partial object form (8) of object form (1) and the partial master form (9) of master form (2) are located in partial areas (6) and (7). Partial object form (8) and partial master form (9) are also referred to as partial image and partial master image. FIG. 1 shows a partial object form (2) containing a fault (10) which is located in partial areas (6) and (7).

The partial areas are so selected that the partial images and the partial master images have practically the same geometrical form in the areas. A certain difference that depends on the minimum size of the faults to be measured is permissible. The permissible difference is less than the minimum size of the faults.

In further process steps, the appropriate partial images and partial master images are superimposed. Superimposition is described in the following for partial object form (8) and partial master form (9).

Partial object form (8) and partial master form (9) are aligned with regard to the external dimensions in partial areas (6), (7) along straight lines (11), (12) and (13) extending parallel to the X coordinate axis, and along straight lines extending parallel to the Y coordinate axis and not further identified, by relative displacements. The identification quantities used are preferably the amplitudes of ultrasonic signals generated during testing of the object using the ultrasonic method. The identification quantity amplitudes obtained by measuring along the straight lines (11), (12) and (13) and the straight lines extending parallel to the Y axis are shown in the ordinate direction as a function of the distance in the X coordinate direction for partial object form (8) and partial master form (9).

Figure 3A:
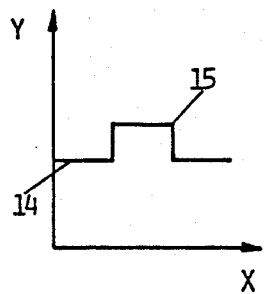
FIGS. 3a to 3d show the identification quantity amplitudes occurring along a straight of the partial area according to FIG. 2 for the master form in the ordinate direction as a function of its position in the abscissa direction.
Figure 3B:
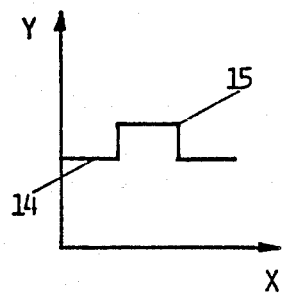
Figure 3C:
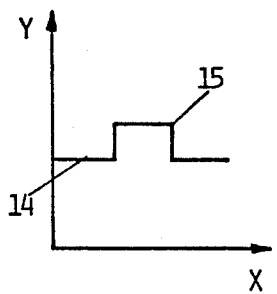
Figure 3D:
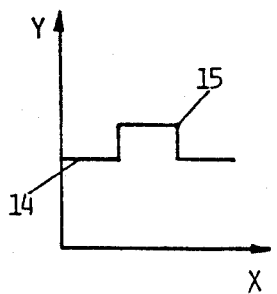

FIG. 3a shows for the straight lines (12) two different amplitudes (14) and (15) of partial master form (9) as a function of the position of partial master form (9) in the X coordinate direction. This is shown four times in FIGS. 3a to 3d, in order to facilitate a comparison with FIGS. 4 to 6 described in the following.

Figure 4A:
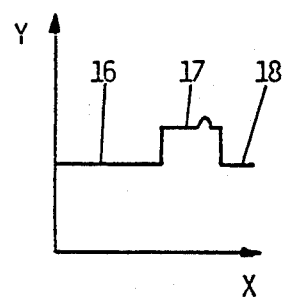
FIGS. 4a to 4d show the identification quantity amplitudes occurring along a straight of the partial area according to FIG. 2 for the respective form in the ordinate direction as a function of its position in the abscissa direction for various process steps.

FIG. 4a shows the amplitudes of the identification quantities of the partial object form (8) along the straight line (12) as a function of the position of the form of the object in the X coordinate direction. Partial object form (8) has three different amplitudes (16), (17) and (18) along the straight lines (12). Amplitudes (16) and (17) correspond to amplitudes (14) and (15) because they were obtained at fault-free points of the object, but they occur at different points along the straight line (12) than for partial master form. The amplitude (18) is caused by the fault (10) in the object.

Amplitudes (16) and (17) of partial object form (8) are subtracted from the amplitudes (14) and (15) of partial master form (9).

Figure 4B:
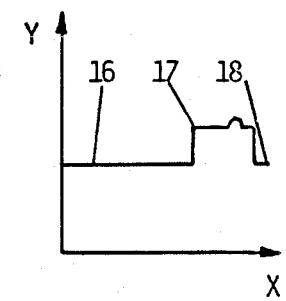
Figure 4C:
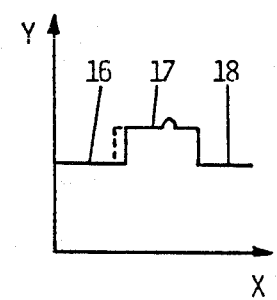
Figure 4D:
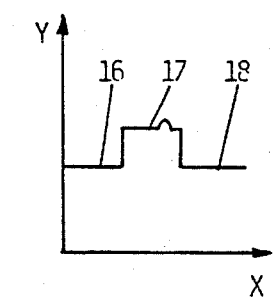
Figure 5A:
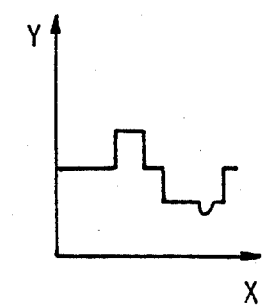
FIGS. 5a to 5d show the difference between the amplitudes of the identification quantities of a partial form and of a partial master form in the ordinate direction as a function of the position in the abscissa direction for four process steps.
Figure 5B:
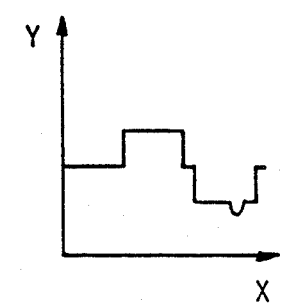

The result of the subtraction for the positions shown in FIG. 1 of object form (1) and of master form (2) is shown in FIG. 5a. This result is converted into an absolute value designated (19), and shown in FIG. 6a. In a further process step, a first displacement is then carried out with regard to the position of the amplitudes (16), (17) and (18) of partial object form (8) in the X coordinate direction. The result of the first displacement is shown in FIG. 4b. After the end of the displacement the difference between the amplitudes (14) and (15) of partial master form (9) and the displaced amplitude values is again generated. The differences are shown in FIG. 5b. From the differences, the absolute value designated (20) is formed, and shown in FIG. 6b.

Figure 5C:
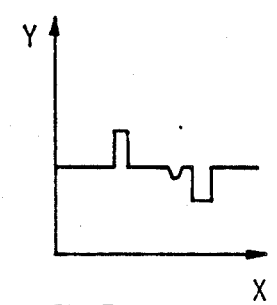
Figure 5D:
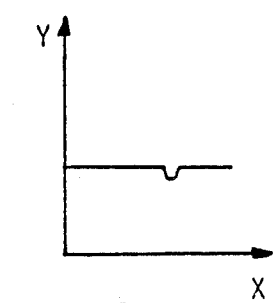
Figure 6A:
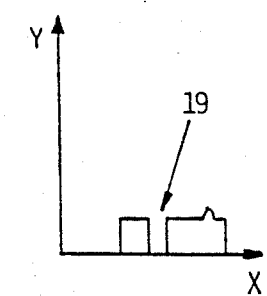
FIGS. 6a to 6d show the absolute values of the differences according to FIGS. 5a to 5d in the ordinate direction as a function of the position in the abscissa direction for four process steps.
Figure 6B:
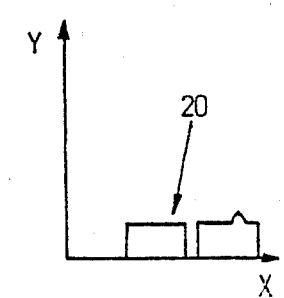
Figure 6C:
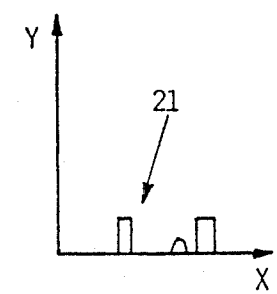

The two absolute values (19) and (20) are then compared. The comparison is preferably based on the integrals of the absolute values (19) and (20). In the following comparison the absolute values denotes their integrals. If the absolute value (20) is greater than absolute value (19), as is shown in FIGS. 6a and 6b, then the displacement direction is reversed in a further displacement step shown in FIG. 4c. Then the amplitudes in their displaced position are subtracted in the correct position from the amplitudes (14) and (15) of partial master form (9). The differences are shown in FIG. 5c. Then the absolute value of the differences, shown in FIG. 6c and designated as (21) are generated. Absolute value (21) is then compared with absolute values (20) and (19). Since absolute value (21) is smaller than absolute values (20) and (19), the correct displacement direction needed to determine a maximum overlap of partial form (8) and partial master form (9) can be found. Amplitudes (16), (17) and (18) are therefore displaced a little further to the left, into the position shown in FIG. 4d. Then amplitudes (16), (17) and (18) corresponding to their position in the X coordinate direction are subtracted in the correct position from amplitudes (14) and (15) of the partial master form. The differences are shown in FIG. 5d.

Figure 6D:
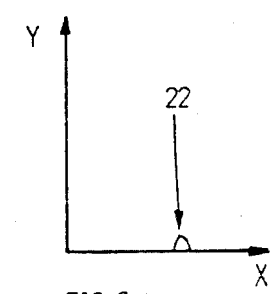

The absolute value designated (22) and shown in FIG. 6d is then formed. Since absolute value (22) is even smaller than absolute value (21), a new absolute value can be obtained in a further displacement step. If this new absolute value is greater than absolute value (22) it is known that the displacement position of amplitudes (16), (17) and (18) associated with absolute value (22) is the position of maximum overlap of partial object form (8) and partial master form (9) along the straight line (12). Since absolute value (22) exists in spite of optimum coincidence, there is a fault in the object.

Figure 7:
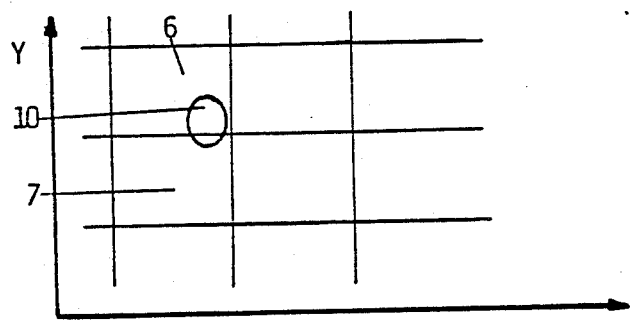
FIG. 7 shows the result of the overlap of a partial form with a partial master form when there is a fault in the object.

The method described above is continued for the various straight lines in partial areas (6) and (7). If after this the differences of the amplitudes along the straight lines after the displacements are displayed on a monitor, only the fault (10) is still visible, as is shown in FIG. 7. The entire C-image can then be processed in similar manner using the differences formed for all partial areas on the basis of corrected position coordinates. The faults are then recognizable in their entirety.

The position coordinates of the amplitudes after detection of the maximum overlap are stored in the memory in each case and used as starting values for the adjacent partial area.

Using the above method, it is possible above all to check objects of constant strength. It is particularly useful to compare C-images obtained using the ultrasonic method with corresponding master images.

Figure 8:
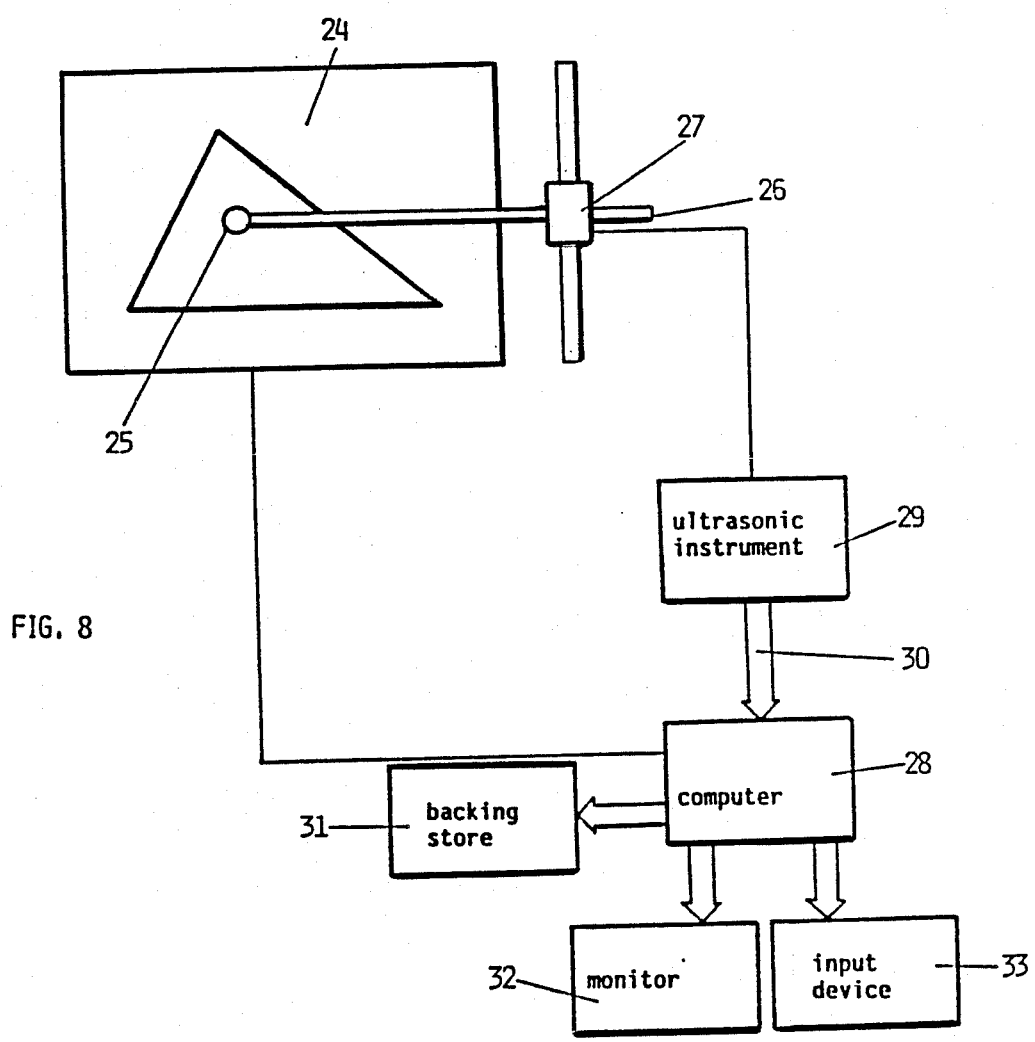
FIG. 8 shows a general circuit diagram of a device for detecting faults in an object.

In the device shown in FIG. 8, the object (23) is fastened to a supporting means (24). An ultrasonic test head (25) is mounted on a first member (26), which is mounted in a longitudinally adjustable manner in to a second member (27), which is also arranged in a longitudinally adjustable manner. By means of the two members (26), (27), the ultrasonic test head (25) can be moved along the abscissa and ordinate axes of a right-angled coordinate system. The drive means for the two members (26), (27) are not illustrated further. The object (23) is within the area covered by the test head (25) using the members (26) and (27). The drives for the members (26) and (27) are controlled by a computer (28). The actual position value transmitters for the ultrasonic test head (25) are also connected to the computer (28). The drives and the actual position value transmitters are also not illustrated further. The ultrasonic test head (25) is connected to an ultrasonic instrument (29) which in turn is connected to the computer (28) via a channel (30). A memory (31), a monitor (32) and an input device (33) are also connected to the computer (28). The ultrasonic instrument (29) is controlled by the computer (28) during testing of the object (23). The data generated by the ultrasonic instrument (25) are transferred via channel (30) for preselected coordinate points that are signalled by actual value transmitters not shown in detail.

The data of the master form are input into the memory (31) using the input device (33) and are therefore available for processing the values measured by the ultrasonic test head (25).

Figure 9A:
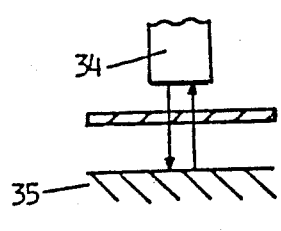
FIGS. 9a to 9c show various arrangements of ultrasonic test heads usable in the device according to FIG. 8.

The ultrasonic test heads can be arranged in different ways for testing the object. FIG. 9a shows a transmitter-receiver test head arranged a distance from the object (23), which in its turn is arranged at a distance from a reflector (35). This permits testing by double sonic transmission.

Figure 9B:
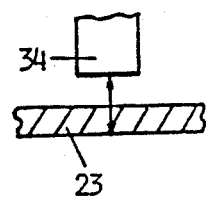
Figure 9C:
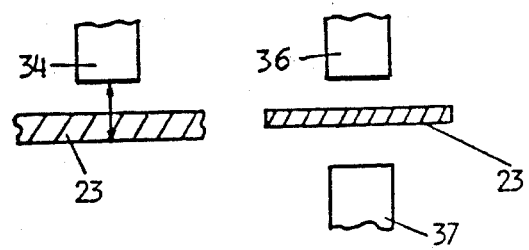

The arrangment shown in FIG. 9b permits testing using the pulse-echo method. In the arrangement shown in FIG. 9c, ultrasonic test heads (34), (37) are arranged on both sides of the object along the same axis. This enables testing using the single sonic transmission method.

While the invention has been described in connection with what is presently considered to be the most practical and preferred embodiment, it is to be understood that the invention is not limited to the disclosed embodiment, but intended to cover various modifications and equivalent arrangements within the spirit and scope of the appended claims.

What is claimed is:

1. A method for nondestructively detecting faults in and an object comprising the steps of:

measuring fault related values at various points of said object;

storing said measured fault related values with respect to a coordinate system in memory locations;

obtaining master values which relate to an object not having faults;

storing said master values with respect to said coordinate system in memory locations;

comparing said measured values and said master values to each other so that corresponding edges or corners are found;

aligning said measured values and said master values by restoring said measured values in said memory so that said corresponding edges and corners have corresponding coordinates to said master values;

defining partial areas of said aligned measured values and corresponding partial areas of said aligned master values so that each of said partial areas and corresponding partial areas have the same coordinate distances from said edge;

aligning said measured values in said partial areas and said master values in said corresponding partial area by restoring said measured values of said corresponding partial areas in memory locations to obtain minimal differences between said measured values and master values; and determining a fault difference between said twice aligned measured values in said partial areas and said twice aligned master values in said corresponding partial areas to determine if said fault exists.

2. A method according to claim 1 wherein:
   said object has a constant thickness; and
   said second alignment step includes the step of shifting said master values or said measured values located in said partial area and stored in said memory to obtain maximum overlap of said master values and said measured values in said partial areas.

3. A method according to claim 1 further including the step of displaying said fault difference on a monitor.

4. A method according to claim 1 wherein said second step of aligning includes the steps of:

subtracting corresponding measured values from said master values to obtain first difference values;

shifting said measured values or said master values located in said partial area;

subtracting corresponding measured values and master values after said shifting to obtain second difference values;

comparing said first and second difference values to determine an absolute difference; and shifting said master values or said measured values located in said partial area and stored in said memory on the basis of said absolute difference to obtain said alignment.

5. A method according to claim 4 wherein:

an integral of said first difference values and second difference values are compared in said difference comparison step;

said substracting and difference comparison steps are repeated until a minimum absolute value is obtained; and said shifting step uses said minimum absolute value to obtain said alignment.

6. A method according to claim 4 further including the step of using coordinates of said twice aligned values as starting coordinates to determine alignment of measured values and master values in an adjacent partial area.

7. An apparatus for non-destructively detecting faults in an object through comparison with predetermined master values associated with a fault-free object comprising:

means for measuring fault related values at various points of said object;

first memory means for storing said measured values;

second memory means for storing said predetermined master values; and means for detecting said faults using said measured values and said master values, said detecting means including:

means for associating said measured values and said master values stored in said first memory means and said second memory means with respect to a coordinate system, means for aligning said measured values and said master values stored in said first and second memory means, respectively, means for determining partial areas of said measured values and corresponding partial areas of said master values, means for aligning said measured values and said master values located in said determined partial areas, respectively, means for detecting faults by comparing said measured values and said master values located in said corresponding partial areas; and means for indicating when said detecting means detects said fault.

8. An apparatus according to claim 7 wherein said measuring means includes an ultrasonic test head and an ultrasonic test instrument.

9. An apparatus according to claim 8 wherein said ultrasonic test head includes actual position value transmitters.

10. An apparatus according to claim 7 wherein said indicating means is a monitor capable of graphically illustrating said fault.

* * * * *